United States Patent
Kaethner et al.

(10) Patent No.: US 10,789,741 B1
(45) Date of Patent: Sep. 29, 2020

(54) METHOD FOR DETERMINING CORRECTED ACQUISITION GEOMETRIES OF PROJECTION IMAGES

(71) Applicant: Siemens Healthcare GmbH, Erlangen (DE)

(72) Inventors: Christian Kaethner, Forchheim (DE); Michael Manhart, Fürth (DE); Alexander Preuhs, Munich (DE); Markus Kowarschik, Nuremberg (DE)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 16/804,460

(22) Filed: Feb. 28, 2020

(30) Foreign Application Priority Data

Mar. 7, 2019 (EP) .................. 19161295

(51) Int. Cl.
*G06K 9/00* (2006.01)
*G06T 11/00* (2006.01)
*G06T 7/00* (2017.01)

(52) U.S. Cl.
CPC .......... *G06T 11/005* (2013.01); *G06T 7/0012* (2013.01); *G06T 2207/10116* (2013.01); *G06T 2211/424* (2013.01)

(58) Field of Classification Search
CPC . G06T 2207/10072; G06T 2207/10076; G06T 2207/10081; G06T 2207/10084;
(Continued)

(56) References Cited

U.S. PATENT DOCUMENTS

2012/0201352 A1* 8/2012 Dennerlein .......... A61B 6/4452
378/62

FOREIGN PATENT DOCUMENTS

DE 102011003653 A1 8/2012

OTHER PUBLICATIONS

Frysch, Robert, and Georg Rose. "Rigid motion compensation in interventional C-arm CT using consistency measure on projection data." International Conference on Medical Image Computing and Computer-Assisted Intervention. Springer, Cham, 2015. (Year: 2015).*

(Continued)

*Primary Examiner* — Avinash Yentrapati
(74) *Attorney, Agent, or Firm* — Lempia Summerfield Katz LLC

(57) ABSTRACT

A method is provided for determining corrected acquisition geometries of projection images. The method includes providing a projection image dataset that has a plurality of projection images of an object under examination acquired by an acquisition device in different acquisition geometries. The method further includes determining a provisional acquisition geometry for each of the projection images by a first optimization method by minimizing a first cost function by varying the provisional acquisition geometry, wherein the first cost function is contingent on a plurality of consistency measures determined based on the provisional acquisition geometry for a respective pair of projection images. The method further includes determining the respective corrected acquisition geometry for each of the projection images by a second optimization method by minimizing a second cost function by varying the corrected acquisition geometries, wherein the second cost function is contingent on a measure for an image quality of image data reconstructed based on the projection images and the corrected acquisition geometries, and wherein, in a first iteration act of the second optimization method, the provisional acquisition geometries determined by the first optimization method are used as corrected acquisition geometries.

14 Claims, 4 Drawing Sheets

(58) Field of Classification Search
CPC .......... G06T 2211/40; G06T 2211/404; G06T 2211/421; G06T 2211/424; G06T 2211/428; G06T 2211/432; G06T 2211/436; G06T 2207/10104; G06T 2207/10101; G06T 2207/10096; G06T 2207/10088; G06T 2207/10092; G06T 11/005; A61B 6/027; A61B 6/032; A61B 6/035; A61B 6/4441; A61B 6/4452; A61B 6/4458; A61B 6/583; A61B 6/584; G01N 2223/3303; G01N 2223/419; G01N 23/046
See application file for complete search history.

(56) References Cited

OTHER PUBLICATIONS

Frysch, Robert, and Georg Rose. "Rigid motion compensation in interventional C-arm CT using consistency measure on projection data." International Conference on Medical Image Computing and Computer-Assisted Intervention. Springer, Cham, 2015. pp. 298-306.

Lesaint, Jérôme. "Data consistency conditions in X-ray transmission imaging and their application to the self-calibration problem" Thesis, Universite Grenoble Alpes. May 2018. pp. 1-140.

Ouadah, S., et al. "Self-calibration of cone-beam CT geometry using 3D-2D image registration." Physics in Medicine & Biology 61.7 (2016): pp. 2613-2632.

Ronneberger, Olaf, et al. "U-net: Convolutional networks for biomedical image segmentation." International Conference on Medical image computing and computer-assisted intervention. Springer, Cham, May 2015. pp. 1-8.

Wicklein, Julia, et al. "Image features for misalignment correction in medical flat-detector CT." Medical physics 39.8 (2012): 4918-4931.

European Search Report for European Application No. 19161295. 1-1210 dated Sep. 9, 2019, with English translation.

* cited by examiner

METHOD FOR DETERMINING CORRECTED ACQUISITION GEOMETRIES OF PROJECTION IMAGES

The present patent document claims the benefit of European Patent Application No. 19161295.1, filed Mar. 7, 2019, which is hereby incorporated by reference.

TECHNICAL FIELD

The disclosure relates to a method for determining corrected acquisition geometries of projection images. The disclosure also relates to a processing device, a computer program, and a computer-readable medium.

BACKGROUND

Particularly in the field of medical imaging, methods are used in which a plurality of projection images are acquired in order to reconstruct three-dimensional image data from them. For example, x-ray based three-dimensional imaging is used as an important source of data in the context of medical diagnostics. In order to generate sufficient data for a representation that is as accurate as possible, an acquisition device, (e.g., an X-ray detector with an associated x-ray source), is moved around an object under examination on a circular, circular-segment-shaped, or spiral trajectory. Alternatively, it may be advantageous to enable data to be generated for freely selectable positions and trajectories.

For example, because of manufacturing tolerances and/or elasticity of a mechanism used to adjust the acquisition device, deviations may occur between a desired acquisition geometry and an actual acquisition geometry for the individual projection images. Movement of an object under examination, (e.g., a patient), may also result in deviation from a desired acquisition geometry. If these deviations are not considered, (e.g., corrected), during reconstruction, this may result in image artifacts or other diminution of image quality.

The deviations may be detected and corrected through calibration of medical imaging devices prior to imaging, e.g., by sampling a precisely known test piece in order to detect the acquisition geometries actually occurring during the acquisition of projection images as the acquisition device moves along a particular geometry, e.g., with a particular control pattern, and to use them for image reconstruction. However, the problem with this procedure is that such a calibration has to be carried out separately for each trajectory potentially used for acquiring projection images, as tolerances or elasticities may have different effects for different paths of the acquisition device. Upstream calibration of this kind is only of limited suitability if the trajectories or acquisition geometries traversed in the course of the acquisition may largely be freely adjusted according to a specific object under examination or the specific examination situation. In addition, deviations of the acquisition geometry due to motion of the object under examination cannot be compensated by such upstream calibration.

Various approaches for correcting acquisition geometries or for motion compensation are proposed in the prior art. For the compensation of head movements, the article Frysch, R., Rose, G., "Rigid motion compensation in interventional C-arm CT using consistency measure on projection data," International Conference on Medical Image Computing and Computer-Assisted Intervention, pp. 298-306, Springer, Cham, (October 2015), proposes analyzing redundancies in projection data. However, certain rigid motion patterns as well as non-rigid movements such as respiratory or cardiac motions may only be compensated to a limited extent using this approach, as they are difficult to determine by the redundancy conditions applied. In particular, if the acquisition device moves within one plane, motions within that plane may only be detected and compensated to a limited extent.

Another motion compensation approach includes minimizing deviations between a forward projection of the reconstructed image volume and the projection images by varying the assumed imaging geometry. This approach is described in more detail in the article Ouadah, S., et al., "Self-calibration of cone-beam CT geometry using 3D-2D image registration," Physics in Medicine & Biology, 61(7), p. 2613 (2016). However, this approach is only promising if a volume was already able to be reconstructed in sufficient image quality and is also relatively compute-intensive.

Alternatively, a method may be used which evaluates image quality metrics as part of motion correction. Such a method is described in more detail in the article Wicklein, J., et al., "Image features for misalignment correction in medical flat-detector CT," Medical Physics, 39(8), pp. 4918-4931 (2012). However, with this approach it is difficult to find an image quality metric that allows robust measurement of motion intensity from the projection images. For different datasets and motions, the image quality measure has, whenever possible, a global optimum at the location with the correct motion estimation and behave as convexly as possible around the global optimum, e.g., weaker and stronger motions have a monotonic effect on the image quality metric in each case. The complex requirements placed on the image quality metric may result in only a local optimum and therefore not the correct acquisition geometry being found in the event of larger errors of the assumed acquisition geometries. In addition, because of the required back-projections in each iteration act, larger acquisition geometry errors may only be compensated with a high computational overhead.

Another approach for reducing erroneous acquisition geometries when using freely selectable trajectories of the acquisition device is disclosed in German Patent publication DE 10 2011 003 653 A1. The method proposed there is based on model-based calculation of projection matrices.

SUMMARY AND DESCRIPTION

The scope of the present disclosure is defined solely by the appended claims and is not affected to any degree by the statements within this summary. The present embodiments may obviate one or more of the drawbacks or limitations in the related art.

An object of the disclosure is to specify an improved method for correcting acquisition geometries of projection images which allows, in particular, robust and high-quality correction with relatively low computational complexity even in the event of larger errors of the assumed acquisition geometry.

This object is achieved by a method for determining corrected acquisition geometries of projection images of a projection image dataset. The method includes providing a projection image dataset that has a plurality of projection images of an object under examination that have been acquired in different acquisition geometries by an acquisition device. The method further includes determining a provisional acquisition geometry for each of the projection images by a first optimization method by minimizing a first cost function by varying the provisional acquisition geometry, wherein the first cost function is contingent on a plurality of consistency measures which are determined based on the provisional acquisition geometry for a particular pair of projection images. The method further includes determining the respective corrected acquisition geometry for each of the projection images by a second optimization method by minimizing a second cost function by varying the corrected acquisition geometries, wherein the second cost function is contingent on a measure for an image quality of image data reconstructed based on the projection images and the corrected acquisition geometries, and wherein, in a first iteration act of the second optimization method, the provisional acquisition geometries determined by the first optimization method are used as corrected acquisition geometries.

Within the scope of the disclosure, it is recognized that by sequentially using the two optimization methods cited, surprisingly high correction quality may be achieved with relatively low computational overhead. It is realized that the weaknesses of image-quality-based optimization methods, namely a lack of robustness in particular application situations and relatively high computational overhead, may be reduced or even completely avoided by pre-optimization being performed by a method that corrects the acquisition geometry based on the expected consistencies between different projection images.

As consistencies between the projection images are evaluated in the first optimization method, compute-intensive reconstruction, e.g., a back-projection, and forward projections may be dispensed with, so that the first optimization method may be carried out with low computational overhead. At the same time, however, such an optimization method, as explained in the introduction, cannot robustly compensate all the acquisition geometry errors. If all the acquisition geometries describe a movement of the acquisition device within a plane in each case, the displacements or rotations within that plane may only be detected/corrected to a limited extent. However, this weakness of this optimization method may in turn be compensated by following it with the second optimization method. Because of the preliminary correction by the first optimization method, the search space for the correct acquisition geometry is significantly reduced within the framework of the second optimization method, so that the second optimization method may also be carried out with acceptable computational overhead. The two optimization methods therefore interact synergistically to provide robust and accurate correction of acquisition geometries with minimal complexity.

If an object under examination is imaged in different acquisition geometries, use may be made of the fact that, (e.g., in the case of cone-beam X-ray imaging), certain redundancies exist between the first projection images or rather a certain consistency is to be expected, (e.g., a certain relationship between particular image regions). The likely consistencies are shown in detail in Section 2.1 of the above cited publication of R. Frysch and will only be briefly summarized here.

If a level is considered which runs through an X-ray source and intersects an X-ray detector, (e.g., the acquisition device), the part of the object under examination that lies in this plane is imaged on the line of intersection between detector plane and the plane considered. If two projection images are now considered for which the respective positions of the X-ray source both lie in a plane which also intersects both detector planes, the section of the object under examination lying in this plane is imaged in both projection images on a respective line. If at least the same absorption-relevant region of the object under examination is completely imaged within the respective lines, corresponding image regions are strongly correlated. If this is not the case, this may indicate an erroneously assumed acquisition geometry. This may be utilized as follows:

For each of the projection images i and each plane intersecting it, a variable $S_i(\upsilon,s)$ may be calculated as follows:

$$S_i(\upsilon, s) = \frac{s^2 + D^2}{D^2} \cdot \frac{\partial}{\partial s} R[\tilde{g}_i](\upsilon, s),$$

where $$\tilde{g}_i(x, y) = \frac{D}{\sqrt{x^2 + y^2 + D^2}} \cdot g_i(x, y)$$

Here, $\upsilon$ describes the angle at which the corresponding plane intersects the detector plane and s describes the distance of this line of intersection from the origin. D is the distance between X-ray source and X-ray detector and $R[\tilde{g}_i](\upsilon,s)$ is the Radon transform of the cosine-weighted projection images $g_i$, x, and y are the pixel coordinates in the respective projection image. If N-planes are now considered in which both X-ray sources lie in the case of the assumed acquisition geometry and which intersect the detector surfaces of both projection images, the following consistency measure may be defined for the pair i,j of two projection images:

$$\varepsilon_{ij} = \frac{1}{N} \sum_{n=1}^{N} |S_i(\upsilon_i^n, s_i^n) - S_j(\upsilon_j^n, s_j^n)|^p$$

The exponent p here specifies which p-norm is selected. The publication of R. Frysch proposes setting p to 0.3. However, other values may be used.

The cost function may be determined, for example, by summing the respective consistency measures $\varepsilon_{ij}$ over all the pairs of projection images. The sum total determined is therefore a p-norm of the differences between the different S-values. Varying the provisional acquisition geometry results, on the one hand, in a change in the position of the X-ray source for the different projection images and may therefore result in an evaluation of different planes for individual projection image pairs. On the other hand, the position of the detector plane and therefore the progression of the line of intersection between plane and detector plane changes. The cost function may therefore be minimized by varying the acquisition geometries.

In the course of the second optimization method, a three-dimensional image dataset may be reconstructed in each optimization act or iteration. Various methods for reconstructing three-dimensional image datasets for known acquisition geometries of the projection images are well known in the prior art and will not be explained in detail. The measure for the image quality may then be calculated based on the entire reconstructed image data or also based on one or more sectional images. For example, image qualities for a plurality of sectional images may also be calculated and the cost function may be a p-norm or similar of these different image qualities. Various usable measures for image quality are discussed in section II C of the above cited publication of J. Wicklein et al. These measures may be used individually, or the cost function may include a weighted sum or p-norm of a plurality of these measures. As will be explained in even greater detail below, the measure for the image quality may be determined by an algorithm trained by machine learning.

In particular, to optimize or vary the provisional or corrected acquisition geometries, optimization algorithms for optimizing nonlinear functions having a plurality of parameters may be used, e.g., a downhill simplex method, also known as the Nelder-Mead method.

The projection image dataset may be determined by predefining for each of the projection images a desired position and/or desired orientation for the acquisition device and by using at least one actuator to place the acquisition device in the desired position and/or desired orientation, after which the acquisition device is used to acquire the respective projection image. In a first iteration of the first optimization method, acquisition geometries predefined based on the respective desired position and/or desired orientation are used as provisional acquisition geometries. The position of the object under examination may be assumed to be constant or, for example, at least approximately detected by sensors and considered. In particular, a trajectory may be predefined along which the acquisition device is guided by the actuating elements in order to place it successively in the different desired positions. The actual trajectory of the acquisition device and the acquisition geometries actually used may be different from the predefined trajectory and the predefined acquisition geometries. Here, it would be possible in principle, to allow for static deviations, e.g., calibration deviations, and/or deviations contingent on ambient conditions, e.g., due to thermal expansion of components, by appropriate calibration or allowance for ambient conditions. However, tolerances that depend on a specific adjustment path, and which may be caused, for example, by play or elasticity of the adjustment mechanism, are otherwise difficult to compensate if desired positions or desired orientations or the trajectory used are largely freely selected, so that the explained method may be used in particular to compensate acquisition geometry errors resulting from these causes.

The desired position and/or desired orientation may be predefined based on the object under examination and/or of a user input, and/or the desired positions cannot lie on a circular path. As already mentioned, in the cases cited it is difficult to correct the acquisition geometry (e.g., by prior calibration), which means that the method may be used particularly advantageously. Particularly in the case of largely freely predefined desired positions or desired orientations or trajectory along which the acquisition device is guided, the method may nevertheless achieve a very good accuracy of the corrected acquisition geometries and therefore, in particular, high-quality reconstruction of the three-dimensional image data.

As an acquisition device, an X-ray detector may be used which is disposed together with an X-ray source on a support, (e.g., a C-arm). In the context of determining a corrected acquisition geometry, it may be assumed in the simplest case that the relative position of X-ray source and X-ray detector is known and unchanging. However, in order to be able to also allow for distortions of the C-arm or other deviations in the relative position, it is possible for a change in the relative position of X-ray source and X-ray detector also to be taken into account in the course of optimizing the provisional and/or corrected acquisition geometry. If a fan-beam X-ray source having sufficient angular width is used, any X-ray source orientation error may be disregarded, so that the acquisition geometry may be described, for example, solely by the position and orientation of the X-ray detector and the position of the X-ray source.

The X-ray detector and X-ray source may be adjustably or rigidly fixed to the arm. Allowing for a relative position of X-ray source and X-ray detector is relevant particularly if at least one of these components is adjustably mounted on the arm.

The projection image dataset may be determined by predefining, for each of the projection images, the or a desired position and/or desired orientation for the acquisition device with respect to a positioning device on which the object under examination is supported, and using the or an actuator to place the acquisition device in the desired position and/or desired orientation, after which the acquisition device is used to acquire the respective projection image. In a first iteration act of the first optimization method, the provisional acquisition geometries are predefined on the assumption that, between the projection image acquisitions, the object under examination is non-moving relative to the positioning device or moves according to a predefined pattern. In other words, the method is used to at least compensate motion of the object under examination or of a section of the object under examination, e.g., to correct a deviation from an expected or predefined pattern of motion. A predefined pattern of motion may be obtained by sensors, (e.g., by a camera and markers placed on the object under examination), or determined based on a model for a pseudoperiodic pattern of motion, e.g., respiration or heartbeat.

The second optimization method may be carried out subject to the constraint that the value of the first cost function for the corrected acquisition geometries is less than or equal to the value of the first cost function for the provisional acquisition geometries determined by the first optimization method. In other words, only acquisition geometries which, in respect of the cost function used in the first optimization method, are at least just as optimal as the provisional acquisition geometries finally determined in the first optimization method are considered in the second optimization method. This therefore prevents use of the second optimization method from resulting in a worsening in respect of a cost function used in the first optimization method.

This may be particularly advantageous if, in the first optimization method, the acquisition geometry is optimized exclusively in respect of degrees of freedom, to which the first cost function is particularly sensitive, as will be explained in more detail below. The second optimization function may in this case be used primarily to correct the remaining degrees of freedom, wherein any increase in the error in the degrees of freedom already considered in the first optimization may be prevented by the constraint as a result. The constraint may be evaluated, for example, by storing the value of the first cost function at the end of the first optimization and comparing it with the values of the first cost function for the corrected acquisition geometries determined as part of the second optimization.

To determine the image quality measure, an algorithm may be used which is trained by a machine learning method. The algorithm used may be a neural network, (e.g., a convolutional neural network). Machine learning algorithms, especially convolutional neural networks, are particularly suitable for recognizing and considering a large number of image characteristics at different levels of resolution. Compared to known image quality measures as discussed in the above cited publication of J. Wicklein, a machine learning algorithm may learn a large number of suitable image characteristics and combine them in the best possible manner.

The algorithm may process, as input data, the entire reconstructed image data, in particular a three-dimensional volume image dataset. However, it is also possible for only parts of the reconstructed image data, or rather processing data generated therefrom, to be processed by the algorithm. For example, the algorithm may process, as input data, an image slice or a plurality of image slices which are determined from the reconstructed image data. As an output value, the algorithm may provide a single scalar quantity which is the measure for the image quality. As will be explained in greater detail below, this allows simple training of the algorithm and simple further processing of the output data. Potentially, however, feature vectors or similar may also be output in order, for example, to analyze separately a plurality of dimensions of an image quality.

In neural networks, particularly in convolutional neural networks, image features may be extracted from the input data in a plurality of consecutive layers by convolution, application of activation functions and downsampling. As the last layer, a "fully connected layer" is used to combine the image features into a scalar quantity which is the measure for the image quality. The operation of neural networks and in particular of convolutional neural networks is well known in the prior art from other fields of application and will not be described in greater detail.

The algorithm may be trained by supervised training in which individual training datasets each include input data for the algorithm and a desired result. The training datasets may each include three-dimensional image data or image slice data of one or more image slices. The three-dimensional image data or image slice data may be reconstructed with a known acquisition geometry error. This enables a measure describing this error to be incorporated in the respective training dataset as the desired result. As part of the supervised learning, a deviation of the processing result of the algorithm from the desired result may be minimized. For this purpose, error backpropagation may be used, for example. Various possibilities for training machine learning algorithms are known in the prior art and will not be explained in detail.

The algorithm may have been or be trained by training sets which include the reconstructed image data and a desired value for the image quality measure to be determined for this reconstructed image data, wherein the reconstructed image data is or has been reconstructed from predefined projection images in such a way that, in the reconstruction, an acquisition geometry modified according to a modification predefinition is taken into account for at least one of the projection images, wherein the desired value is or has been determined as a function of the modification predefinition. This provides, as explained above, that the three-dimensional image data or image slice data with a known error is reconstructed and the training dataset includes a measure describing this error.

Projection images whose imaging geometry is known with a high degree of accuracy may first be determined here. Such projection images may be determined, for example, by imaging a non-moving object using a fixed trajectory for the acquisition device, e.g., a fixed sequence of acquisition geometries, wherein a calibration of the device used has been carried out for this trajectory or sequence, as explained in the introduction. Alternatively or in addition, projection images with correspondingly precisely known acquisition geometry may be artificially generated by forward projection of three-dimensional image data. Here, for example, synthetic three-dimensional image data or image data that has been reconstructed with high quality elsewhere may be used. The highly accurate and error-free acquisition geometry of these projection images may then be modified. Here, a large number of different modifications may be carried out for a set of projection images. For example, identical or different displacements and/or rotations of the acquisition device with respect to the object under examination may be provided for different of the projection images. If, as explained in the foregoing, a relative movement between X-ray source and X-ray detector is to be allowed for, this may be considered when modifying the acquisition geometry. A reconstructed image dataset or a plurality of reconstructed image datasets may then be reconstructed by a reconstruction algorithm as a function of the modified acquisition geometry or geometries.

As the extent to which the acquisition geometry has been modified is known, a measure therefor may be incorporated in the corresponding training dataset. In the simplest case, for example, a weighted sum of motions and/or rotations used as part of the modifications may be included as a desired value. However, it has been found to be advantageous to use a so-called back-projection mismatch as a desired value, or rather to determine a desired value that has been determined as a function of the back-projection mismatch.

The back-projection mismatch is a measure for the extent to which individual pixels are shifted in the projection images by the modification of the imaging geometry. Such a measure may be determined, for example, by predefining synthetic three-dimensional image data which includes a plurality of individual pixels that may be equidistant from one another. For each projection image to be taken into account, a forward projection of the individual pixels is now determined once for a correct acquisition geometry and once for an acquisition geometry that has been modified according to the modification predefinition and the distance or distance vector between the thus projected points is determined as an imaging error for this projection image and this point. The back-projection mismatch is determined as a measure, in particular as a 2-norm or other p-norm, of the imaging error for the different points and projection images.

In summary, the disclosure therefore also relates to a method for training an algorithm by a machine learning method. In particular, supervised learning may take place here and the training datasets may be predefined as described above. The disclosure also relates to an algorithm, trained by such a training method, for determining a measure for an image quality of image data reconstructed from projection images or, as a method result, parameters of an algorithm which are determined as part of such a machine learning method. The disclosure additionally relates to a computer-readable medium which stores the trained algorithm in the form of readable and executable program sections or rather stores parameters, determined as part of the machine learning method, for parameterizing such an algorithm.

In the method for determining corrected acquisition geometries of projection images, the second cost function may additionally depend on a plurality of consistency measures which are determined as a function of the corrected acquisition geometry for a respective pair of projection images. In particular, the second cost function may include a term which corresponds to the first cost function except that, to determine this term, the corrected acquisition geometries are considered instead of the provisional acquisition geometries. This term, e.g., a term which depends on the consistency measures, may be weighted in the second cost function by a weighting factor which specifies the extent to which consistency measures affect the second optimization method. By taking the consistency measures into account also in the second cost function, optimization of the consistency between projection image pairs and the image quality of the reconstructed image data may take place simultaneously, thereby enabling the convergence of the optimization to be accelerated and/or the optimization result to be improved in many cases.

The provisional and the corrected acquisition geometry of each projection image may be described by a plurality of geometry parameters, wherein the geometry parameters each describe a translation or a rotation of the acquisition device or of a component of the acquisition device with respect to the object under examination, wherein only a subgroup of geometry parameters that does not include all the geometry parameters is varied as part of the first optimization method in order to determine the provisional acquisition geometries. If in the case of X-ray acquisitions, for example, both the X-ray source and the X-ray detector are guided largely within a plane, deviations of the acquisition geometry within that plane, e.g., rotations about an axis perpendicular to that plane or rather displacements in the plane, may only have a relatively insignificant effect on the consistency measures, whereas rotations about axes lying in the plane or rather a displacement perpendicular to the plane may result in a significantly greater change in the consistency measures. Depending on the specifically used acquisition geometries or rather trajectory of the acquisition device, the first cost function may therefore depend to a much greater extent on some of the geometry parameters than on other geometry parameters. As part of the first optimization method, only the geometry parameters whose variation has a relatively significant effect on the consistency measures and therefore on the first cost function are varied for the acquisition geometries used or planned. The remaining geometry parameters may only be varied, e.g., as part of the second optimization method.

In addition to the geometry parameters mentioned or alternatively thereto, the acquisition geometry may also describe a deformation of the object under examination or rather a movement of sections of the object under examination relative to one another, e.g., in the case of a patient's respiration or heartbeat. Here, it is possible for these additional parameter to be varied only in the second optimization method, as it has been found that this is much more suitable for corresponding corrections.

For at least one of the projection images, a final acquisition geometry may be determined by a third optimization method by minimizing a third cost function by varying the final acquisition geometry. The third cost function depends on a measure for a deviation between a forward projection of three-dimensional image data according to the final imaging geometry and the projection image. In a first iteration act of the third optimization method, the acquisition geometry determined by the second optimization method for the respective projection image is used as the final acquisition geometry.

In particular, as a measure for the deviation between the forward projection and the respective projection image, a similarity measure may be used, (e.g., the so-called normalized gradient information). The calculation of a corresponding similarity measure is described in more detail, for example, in section 2.4 of the publication S. Ouadah cited in the introduction. Other similarity measures, (e.g., correlation functions and the like), may also be used.

The three-dimensional image data, based on which the forward projection is determined, may be determined from the projection images. Here, for example, the corrected imaging geometries determined as part of the second optimization method may be used. In subsequent iteration acts, even final imaging geometries that were determined in previous iteration acts may also be used.

As the prior optimization provides that the corrected imaging geometry already represents a good approximation for the final acquisition geometry to be determined, only slight variations of the acquisition geometry are required, thereby making a fast convergence of the third optimization method likely. Although an optimization based on forward projection is relatively compute-intensive, the third optimization method may therefore be carried out with acceptable overhead. In particular, the three-dimensional image data may already be provided in high image quality, so that slow convergence or rather an inadequate registration robustness by 2D/3D registration, as could otherwise occur, may be avoided. Additionally, performing the third optimization method may be advantageous particularly if relatively complex deviations of the acquisition geometry, (e.g., due to elastic deformation of the object under examination), are to be compensated.

For at least one respective projection image, the provisional and/or corrected and/or final acquisition geometry may be varied as a function of result data of an algorithm, (e.g., an algorithm trained by a machine learning method), wherein the algorithm processes image data as input data, (e.g., at least one image slice), reconstructed based on the projection images. The algorithm may be the same algorithm as that also used to determine the measure for the image quality. For example, the algorithm may in this case be trained such that the training datasets include not only desired values for the image quality measure but also desired values for the result data. However, it is also possible to use a separate algorithm and to train it in particular by appropriate training datasets.

The result data may predefine in which direction or how greatly the imaging geometries are varied in a respective iteration act. For example, if the geometry parameters explained above are used, the result data may specify which of the geometry parameters are varied how greatly or in which direction. For this purpose, the algorithm may be trained to detect motion between the individual projection images, e.g., a deviation from an assumed imaging geometry for the individual projection images. For example, a motion vector field may be determined, which may then be used in the respective iterative optimization method as prior knowledge for determining the motion, e.g., change in the imaging geometry, for the next iteration. The algorithm may be a convolutional neural network based on a U-network architecture as explained in the article Ronneberger O., et al., "U-Net: Convolutional Networks for Biomedical Image Segmentation," International Conference on Medical Image Computing and computer-assisted Intervention (S. 234-241), Springer, Cham (2015).

As already explained in the context of training the algorithm to determine the image quality measure, training datasets may be used for training which include the reconstructed image data for the reconstruction of which an acquisition geometry modified according to a predefined modification predefinition is taken into account. The way in which the acquisition geometry has been changed for which of the projection images is therefore known in each case. For example, as desired data for the result data, information may therefore be predefined for each projection image as to the way in which the imaging geometry has been modified by the respective modification predefinition. For example, changes to the geometry parameters describing the imaging geometry may be stored in each training dataset as desired values for the result data. This means that the result data may constitute a relatively extensive feature vector, which is why it may be advantageous to provide a neural network according to the above-mentioned U-network architecture, as this architecture is particularly suitable for providing extensive result data.

The acquisition geometry correction implemented by the method may be used in particular to determine three-dimensional image data as a function of the corrected or final acquisition geometries. The method may also therefore be regarded as part of a method for reconstructing a three-dimensional image dataset. The disclosure thus also relates to a method for reconstructing a three-dimensional image dataset.

The disclosure also relates to a processing device for determining corrected acquisition geometries of projection images that is designed to carry out the method for determining corrected acquisition geometries of projection images or for reconstructing three-dimensional image data. The processing device may be implemented as part of a medical image acquisition device, (e.g., an X-ray device such as a C-arm X-ray device). The disclosure therefore also relates to a medical image acquisition device which incorporates a corresponding processing device.

Alternatively, the processing device may be implemented separately from a device for acquiring projection images, e.g., as a workstation computer, server, or as a cloud solution, (e.g., Internet service), where corresponding functionality is provided by one or more remote computers.

The disclosure also relates to a computer program that may be loaded directly into a storage device of a processing device and has program sections for carrying out all the acts of the method when the computer program is executed in the processing device.

The disclosure also relates to a computer-readable medium on which program sections that may be read and executed by a processing device are stored in order to carry out all the acts of the method when the program sections are executed by the processing device.

BRIEF DESCRIPTION OF THE DRAWINGS

Further advantages and details will be illustrated by the following exemplary embodiments and the accompanying schematic drawings in which.

DETAILED DESCRIPTION

Figure 1:
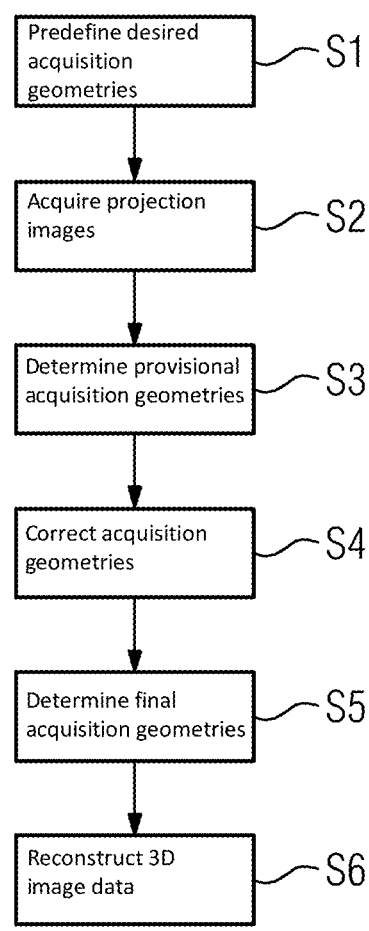
FIG. 1 depicts a flowchart of an exemplary embodiment of the method.

FIG. 1 depicts an exemplary embodiment of a method for determining corrected acquisition geometries of projection images of a projection image dataset or for reconstructing three-dimensional image data from these projection images. In the preparatory acts S1 and S2, a projection image dataset is provided which includes a plurality of projection images of an object under examination that have been acquired in different acquisition geometries by an acquisition device.

For this purpose, desired acquisition geometries to be used in act S1 are predefined, e.g., as part of examination planning. If, for example, a C-arm X-ray device is used to acquire the projection images, in this act, a motion sequence for the C-arm supporting the X-ray source and the X-ray detector, (e.g., a trajectory for the X-ray detector used as an acquisition device), may be predefined. The points in this motion or trajectory at which projection images are to be acquired may also be predefined. Here, it is possible for the desired positions or orientations of the acquisition device for which projection images are to be acquired to be predefined depending on the object under examination and/or a user input, e.g., for the desired positions not to lie on a circular path. In other words, in the method, it is possible for an acquisition trajectory to be freely predefined.

In act S2, the projection images are acquired by an imaging device, (e.g., a C-arm X-ray device), according to the requirements predefined in act S1. For example, because of mechanical tolerances and/or elasticities in an adjustment mechanism for the acquisition device, the acquisition geometry used to acquire a projection image may be at variance with the acquisition geometry planned in act S1. Such a deviation may result in image artifacts, (e.g., a reduction in image quality in reconstructed image data), and must therefore be compensated.

For this purpose, in acts S3, S4, and S5, a multilevel optimization method is carried out, wherein it would alternatively also be possible to carry out only a two-level optimization, e.g., only acts S3 and S4. The individual optimization acts will be described in more detail later with reference to FIG. 2 and will initially only be explained briefly in the following.

In act S3, a first optimization method is initially carried out in order to determine a provisional acquisition geometry for each of the projection images. Here, a first cost function is minimized by varying a provisional acquisition geometry. The cost function is contingent on a plurality of consistency measures determined as a function of the provisional acquisition geometry for a respective pair of projection images. The variation of the provisional acquisition geometry may proceed from the acquisition geometry predefined in act S1. That is to say, it may initially be assumed that the acquisition geometry defined there is at least approximately correct and requires only slight correction. The acquisition geometry predefined in act S1 may be predefined with respect to a positioning device on which the object under examination is supported, e.g., with respect to a patient table. It may initially be assumed that, between the projection image acquisitions, the object under examination is non-moving with respect to the positioning device or moves according to a predefined pattern of motion. The predefined pattern of motion may be detected, (e.g., by sensors), or a motion model may be used, (e.g., for respiration or heartbeat modeling).

In act S4, a further correction of the acquisition geometry is carried out by a second optimization method. Here, a respective corrected acquisition geometry for each of the projection images is determined in which a second cost function is minimized by varying the corrected acquisition geometries. The second cost function is contingent on a measure for an image quality of image data reconstructed based on the projection images and the corrected acquisition geometries. As will be explained in more detail later, this may be determined, e.g., by an algorithm that is trained by machine learning. The initialization in the first iteration act takes place by initially taking the provisional acquisition geometry determined in act S3 as the corrected acquisition geometry.

In some use cases, (e.g., for compensating elastic deformations of the object under examination), it may be advantageous to carry out a third optimization method in act S5 in order to determine a final acquisition geometry. Here, a third cost function is minimized by varying the final acquisition geometry. The third cost function is contingent on a measure for a deviation between a forward projection of three-dimensional image data according to the final imaging geometry and the projection image. The initialization takes place by the corrected imaging geometries determined in act S4.

In act S6, three-dimensional image data is reconstructed in order to use it directly or provide image slices, for example. For this purpose, reconstruction methods are used, wherein the respective final acquisition geometry determined in act S5. Alternatively, in simple method variants, the respective corrected acquisition geometry determined in act S4, is used instead of the acquisition geometry for the projection images that was predefined in act S1. A considerable improvement in image quality may be achieved by this.

Figure 2:
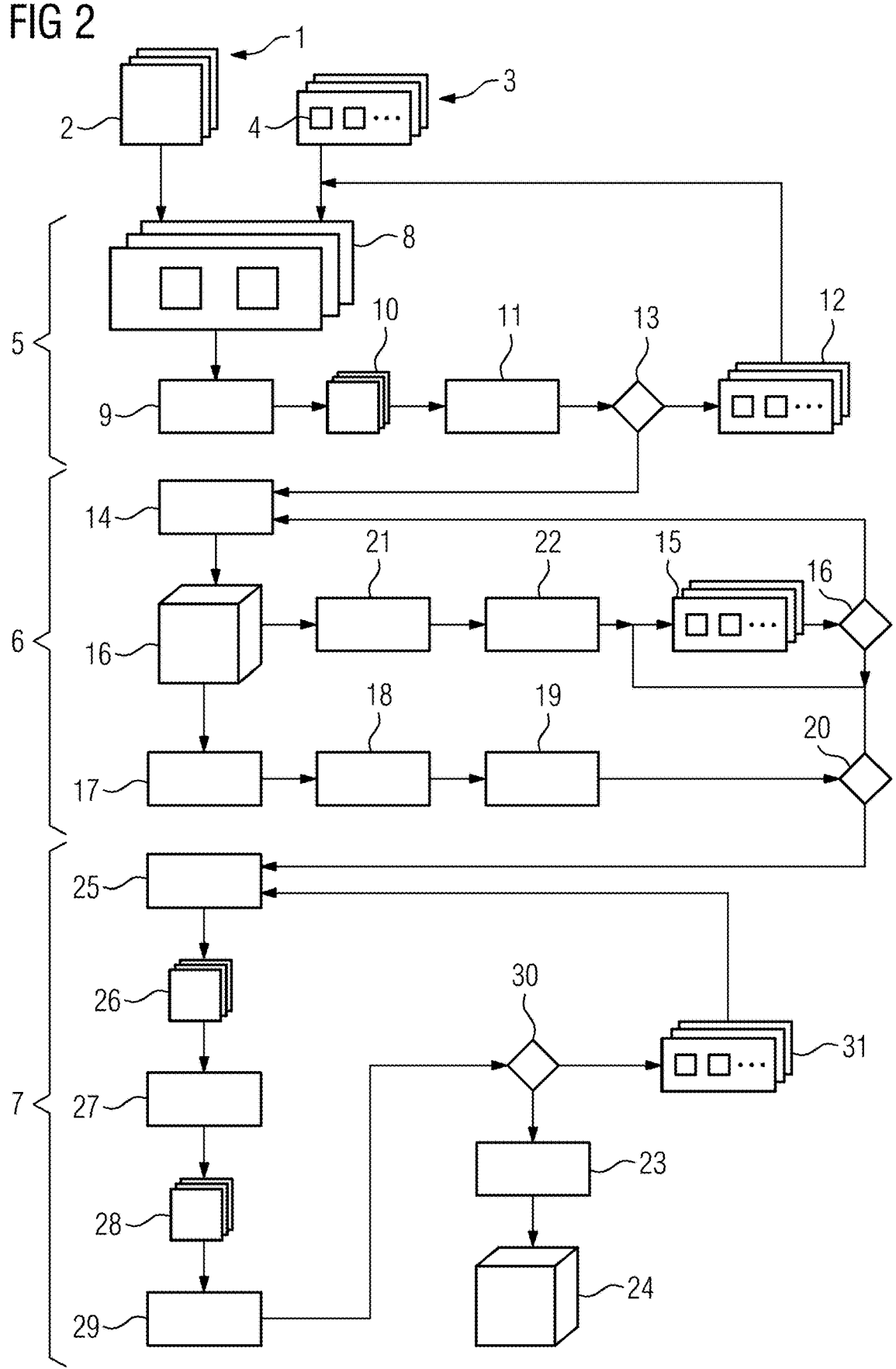
FIG. 2 depicts data structures and algorithms used in an exemplary embodiment of the method.

FIG. 2 depicts data structures and algorithms which may be used to implement the method for determining corrected acquisition geometries. At the start of the method, a projection image dataset 1 including a large number of projection images 2 is predefined. The individual projection images 2 are each assigned an acquisition geometry 3 which may be a desired acquisition geometry specifying which geometry has been predefined for acquisition of the individual projection image data. The respective acquisition geometry may describe a plurality of geometry parameters 4 which describe the position and orientation of an acquisition device, (e.g., an X-ray detector), with respect to the object under examination. For example, a position of the X-ray source, a position of different sections of the object under examination relative to one another, or similar may additionally be described.

As already explained with reference to FIG. 1, the acquisition geometries 3 initially present are potentially significantly errored particularly if the acquisition geometries or rather the trajectory used for the acquisition have been freely predefined or if a patient moves. In order to correct the acquisition geometries 4, at least one first optimization method 5 and one second optimization method 6 are used. Optionally, a third optimization method 7 may additionally be used.

In the first optimization method 5, pairs 8 of projection images 2 are initially formed in each iteration and consistency measures 10 for each of the pairs 8 are determined by an algorithm 9 based on the provisional acquisition geometries 12 for the projection images 2 and of the respective pair 8. The determining of consistency measures c for individual pairs of projection images has already been explained in the foregoing and will not therefore be repeated here. In the first iteration of the first optimization method 5, the acquisition geometries 4 may be initially used as provisional acquisition geometries 12. In subsequent iterations, the provisional acquisition geometries 12 are determined by varying the acquisition geometry.

The individual consistency measures 10 are combined in the form of a first cost function 11 which is to be minimized in the first optimization method 5. The first cost function may be a p-norm of the consistency measures 10. In a test act 13, it is checked in each iteration whether the first optimization method 5 has already converged, (e.g., whether the value of the first cost function 11 is below a limit value). If this is not the case, the provisional acquisition geometries 12 are varied and the first optimization method 5 is repeated. To vary the provisional acquisition geometries 12, (e.g., for optimization), an algorithm for optimizing nonlinear functions may be used, (e.g., a downhill simplex method).

As already explained, in some cases, e.g., if for acquisition of the projection image dataset 1 only a relative movement and rotation of acquisition device and object under examination takes place in a plane, variation of some of the geometry parameters 4 may only result in a slight change in the consistency measures 10 and therefore of the cost function 11. It may therefore be advantageous, in the first optimization method 5, as part of varying the provisional acquisition geometry 12, to vary only the geometry parameters 4 whose variation has a significant effect on the consistency measures 10 or rather the cost function 11.

When the first optimization method 5 is complete, the second optimization method 6 may be carried out in order to reduce still further any acquisition geometry error. In each iteration of the second optimization method 6, reconstructed image data 16 may initially be provided by a reconstruction algorithm 14 based on the projection images 2 and the corrected acquisition geometries 15. In the first iteration, the provisional acquisition geometries 12 provided by the first optimization method 5 may initially be used here as corrected acquisition geometries 15.

When the reconstructed image data 16 has been determined, it is further processed as a three-dimensional image dataset, or at least one sectional image extracted therefrom, by an algorithm 17 in order to determine a measure 18 for the image quality of the reconstructed image data 16. As will be explained later with reference to FIG. 4, the algorithm 17 may be trained by a machine learning method so that the measure 18 may be a good measure for the extent to which the corrected acquisition geometries 15 currently used deviate from the acquisition geometries actually present. A cost function may be contingent on a plurality of such measures 18, e.g., if separate measures 18 are calculated for different sectional images or if the algorithm 17 provides different measures. The different measures 18 may be combined by a p-norm, for example.

The cost function 19 may additionally have another term which largely corresponds to the first cost function, wherein the corrected acquisition geometry used in the respective iteration is used instead of the provisional acquisition geometry used in the first cost function 11 to determine the value of this term. This provides that the measure or measures 18 for the image quality and consistency between the different projection images, as already optimized in the first optimization method 5, may be simultaneously optimized in the second optimization method. Weighting of this additional term makes it possible to predefine the extent to which a consistency condition shall be considered in the second optimization method 6.

In the test act 20, the second optimization method 6 is checked for whether it has already converged, (e.g., whether the value of the cost function 19 is below a limit value). If this is not the case, further variation of the corrected acquisition geometry 15 takes place. This may take place in the same way as the varying of the provisional acquisition geometry 12 according to the downhill simplex method or another algorithm for optimizing nonlinear functions. The corrected imaging geometry 15, however, may be varied based on result data 22 of an algorithm 21 which processes the reconstructed image data 16 or parts thereof, particularly image slices, as input data. The algorithm 21 may likewise be trained by machine learning and is used to determine likely motion vectors or modifications of the geometry parameters for the corrected imaging geometries 15 from the reconstructed image data.

Before the varied corrected acquisition geometries 15 are used in the next iteration of the second optimization method 6, it is first checked in test act 16 whether they are at least as optimal with respect to the first optimization method 5, or rather the cost function 11 there, as the provisional imaging geometries 12 determined in the first optimization method 5. For this purpose, the value of the first cost function 11 may be stored, e.g., for the provisional imaging geometries 12 last determined in the first optimization method 5. This stored value may be compared with the value of the first cost function for the case that, instead of the provisional acquisition geometry 12, the varied corrected acquisition geometry 15 is taken into account as part of calculating the value of the first cost function, in particular in the algorithm 9. If the corrected imaging geometries are less optimal, the varying of the corrected imaging geometries 15 may be repeated until the test condition in test act 16 is fulfilled.

On completion of the second optimization method 6, the determined corrected acquisition geometries 15 may be used directly by a reconstruction algorithm 23 to reconstruct reconstructed image data 24 corrected of the basis of the projection images 2. However, in some cases it may be advantageous to additionally carry out a third optimization method 7.

Here, in each iteration of the third optimization method 7, a forward projection of three-dimensional image data, e.g., of the previously calculated three-dimensional image data 16, is first carried out for each of the projection images 2 by the algorithm 25 in order to generate for each projection image 2 an assigned synthetic projection image 26. The synthetic projection images 26 are each compared with the assigned projection images 2 by the algorithm 27 in order to determine a respective measure 28 for the deviation of the synthetic projection image 26 from the projection image 2. Here, for example, image similarity may be evaluated based on normalized gradient information. The measures 28 are combined, e.g., by a p-norm in a third cost function 29 which is to be minimized by the third optimization method 7.

In test act 30, it is checked whether the third optimization method 7 has already converged. If not, the final acquisition geometry 31 is varied, which may take place in the manner already explained with reference to the provisional acquisition geometry 12 or the corrected acquisition geometry 15. The next iteration of the third optimization method 7 may then be carried out.

If, for example, a lower value than hitherto has been achieved for the cost function 29, the currently determined final acquisition geometry may optionally be used to determine updated three-dimensional image data which may be used in the subsequent iteration acts.

When the third optimization method is complete, the reconstructed image data 24 may be provided by the algorithm 23.

The procedure described in which at least the first and second optimization method are used is advantageous, as advantages of the individual optimization methods, namely their robustness, the estimation of all the possible patterns of motion and their computational efficiency, may be combined. In particular, the testing of the constraint in test act 16 may significantly improve the convergence and robustness of the second optimization method 6 with little additional computational overhead.

The methods described in respect of FIGS. 1 and 2 may be used on the one hand to detect and compensate misalignments of an acquisition device, e.g., deviations of the position or orientation of an X-ray detector and/or of an X-ray source from assumed positions and orientations, for example. By this, for example, an incorrect imaging geometry due to tolerances and/or elasticities of the adjustment mechanism may be compensated even if freely selectable scanning trajectories are used. By using the image quality measure in the second optimization method or the 2D/3D registration in the third optimization method, even non-rigid motions, (e.g., respiratory movements or a heartbeat or respiratory movements in the liver), may be compensated.

In a variant (not shown) of the method, the varying of the final imaging geometries 31, as explained in connection with the varying of the corrected imaging geometries 15, may also take place under the constraint that the consistency between the projection images 2 that is described by the first cost function 11 is not worsened by this variation.

Figure 3:
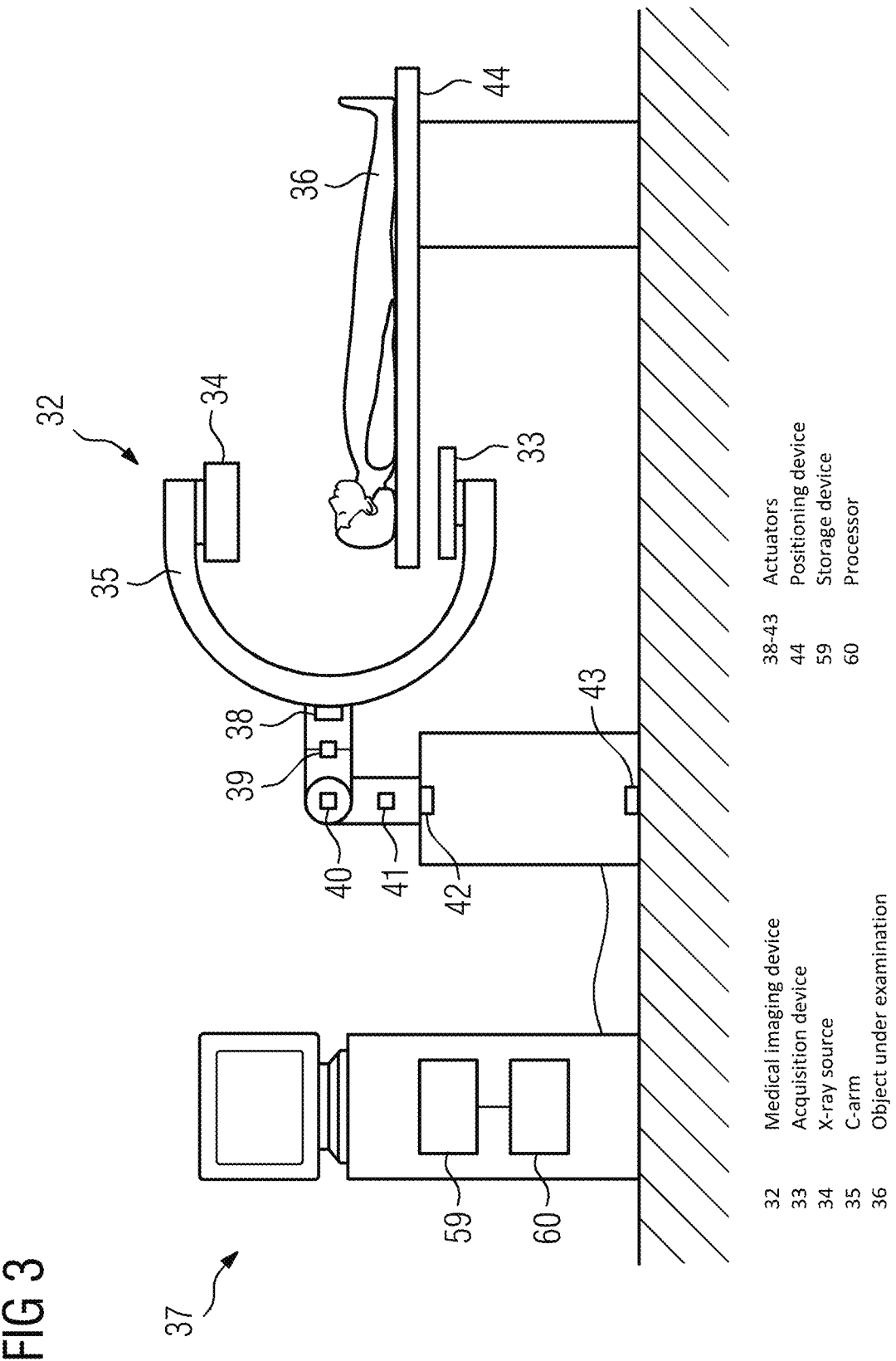
FIG. 3 depicts a medical imaging device incorporating an exemplary embodiment of the processing device.

FIG. 3 depicts a medical imaging device 32 which incorporates a processing device 37 and is configured to generate corrected acquisition geometries of projection images and corrected reconstructed image data. This may take place according to the methods explained above with reference to FIGS. 1 and 2, respectively. The methods may be implemented, for example, by loading a computer program implementing the method acts into a storage device 59 of the processing device 37, wherein the program acts may be executed by a processor 60. Here, a processor 60 may be understood as referring to any kind of programmable processing device, (e.g., a microprocessor, an FPGA, a graphics processor, or a combination of a plurality of the same or different processors). Instead of a local processing device 37, processing may also take place on a server or by a cloud-based solution.

In the example shown, the processing device 37 is also configured, for example, to control the acquisition of the projection images. The projection images are acquired by an acquisition device 33, (e.g., an X-ray detector disposed together with the X-ray source 34 on a C-arm 35). The C-arm 35 may be rotated about three axes and displaced in three directions by a plurality of actuators 38 to 43, whereby the acquisition geometry, (e.g., the position of the X-ray detector with respect to the object under examination 36), is also freely predefinable with six degrees of freedom. If the acquisition geometries for the individual projection images or rather a trajectory followed by the acquisition device 33 are freely predefinable, (e.g., based on characteristics of the patient 36 or a user input), precise calibration of the acquisition geometries may not be achieved for all the possible trajectories, as different trajectories for moving to a particular position may result in different position deviations due to component tolerances, elasticities of individual components, etc. However, these deviations may be well compensated by the method explained in the foregoing.

Acquisition geometries may be planned in a device-fixed coordinate system. In particular, planning may take place in respect of the location of a positioning device 44 for the object under examination 36, e.g., a patient table. Here it is possible that the entire object under examination 36 or sections of the object under examination 36 will move. For example, a patient may involuntarily make slight movements or respiration and/or a heartbeat may displace certain parts of his/her body relative to other parts. Movements of this kind may also be at least largely compensated by the methods explained above. The imaging device may also be used for CT angiography, for example.

As has already been explained with reference to FIG. 2, the algorithm 17 may be trained by a machine learning method to determine the measure 18 for the image quality. It may be trained such that the measure 18 is a good measure for the deviation of the corrected acquisition geometry assumed in the current iteration from the actual acquisition geometry or rather for the relative movement between object under examination and acquisition device in respect of the assumed corrected acquisition geometry. Here, supervised learning may be used in which the algorithm is trained by known machine learning methods, (e.g., by back-propagation of error), using training datasets which in each case include reconstructed image data and a desired value for the image quality measure for this image data.

Figure 4:
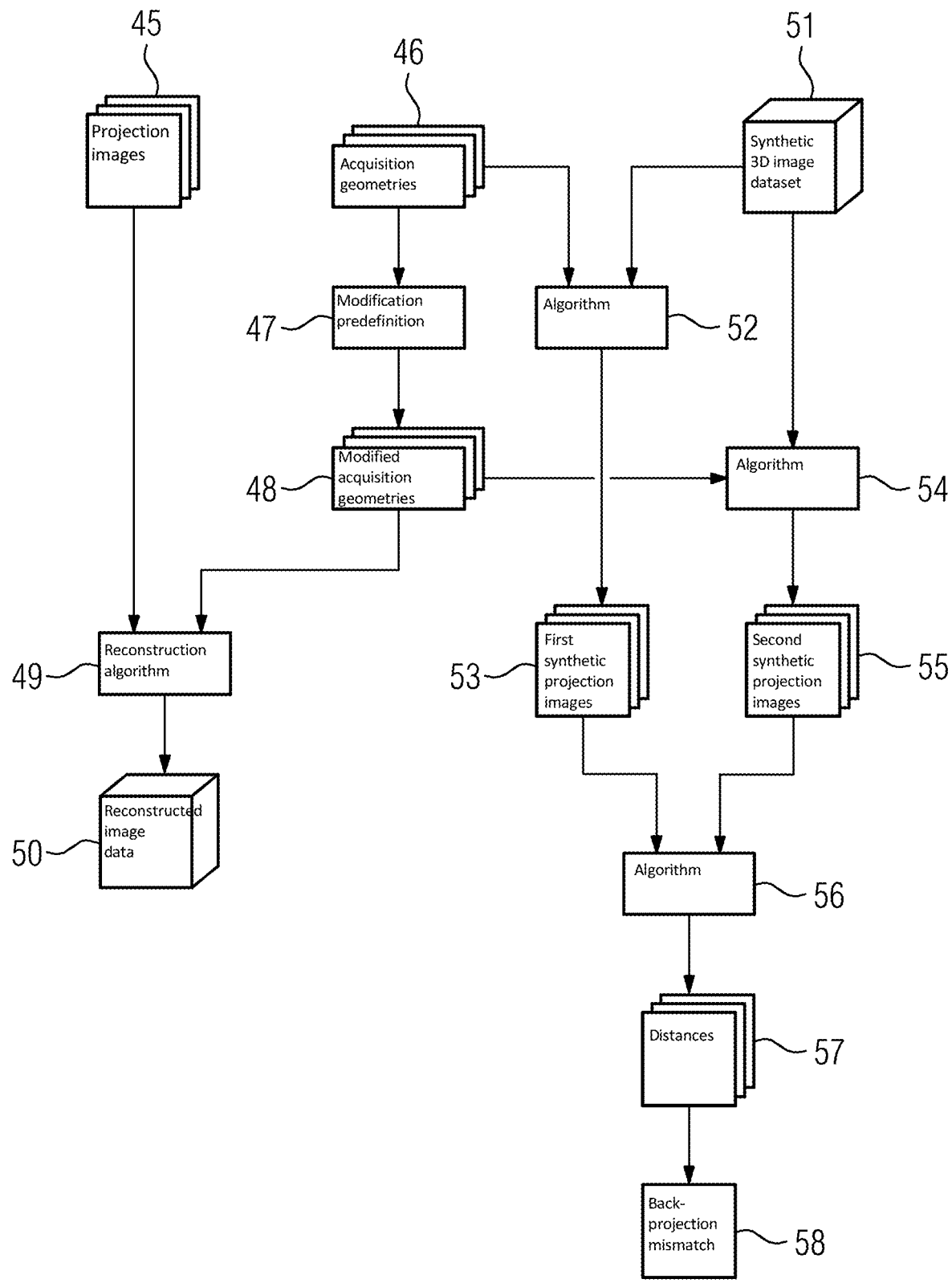
FIG. 4 depicts the provision of training datasets for the training of an algorithm that may be used in the method for determining a measure for an image quality of reconstructed image data.

The providing of appropriate training datasets will now be explained by way of example with reference to FIG. 4. Here, projection images 45 are initially predefined whose acquisition geometry is known with a good degree of accuracy. For example, the projection images 45 may be acquired by guiding the acquisition device along a trajectory for which calibration has been previously performed. For at least parts of the training datasets, the projection images 45 may also be generated by forward-projecting a three-dimensional image dataset which has been reconstructed with a high degree of quality or which has been synthetically generated.

The acquisition geometries 46 are modified according to a modification predefinition 47 in order to provide modified acquisition geometries 48. For example, the modification predefinition 47 may modify the acquisition geometries 46 such that the modified acquisition geometry 48 shows, for at least parts of the projection images 45, a shift in at least one direction and/or a rotation about at least one axis compared to the respectively assigned acquisition geometry 46. In other words, incorrect acquisition geometries are selectively predefined, wherein the error is well known in each case.

By a reconstruction algorithm 49, the projection images 45 are reconstructed according to the modified acquisition geometry 48 in order to obtain reconstructed image data 50. These show precisely the artifacts, (e.g., quality impairments), that are expected if the acquisition geometry is changed according to the modification predefinition.

The desired value for the image quality measure that is to be contained in the training dataset shall be determined such that the measure for the image quality behaves, in respect of a change in the acquisition geometry, similarly to a back-projection mismatch, e.g., similarly to a measure for a change in the positions of point projections in the projection images.

To achieve this, a synthetic three-dimensional image dataset 51 is first predefined which may include a plurality of isolated pixels disposed, in particular, at equal distances from one another. On the one hand, the image dataset 51 is forward-projected by the algorithm 52 according to the original imaging geometries 46 in order to obtain first synthetic projection images 53. On the other hand, it is projected by the algorithm 54 according to the modified acquisition geometries 48 in order to obtain second synthetic projection images 55. The algorithm 56 compares the first and second synthetic projection images 53, 55 in order to determine, for each of the points in the image dataset 51, a distance of the position in the respective second synthetic projection image 55 from the position in the assigned first synthetic projection image 52. These distances 57 are combined using a p-norm, (e.g., a 2-norm), to form the back-projection mismatch 58 which may be incorporated in the respective training dataset as the desired value for the image quality measure.

Based on the same set of projection images 45, a large amount of training data may be generated in which different modification predefinitions 47 are used in each case.

The training of the algorithm 21 used in the second optimization method 6 in FIG. 2 is not explicitly shown. As this algorithm is designed, for example, to predict motion vectors, (e.g., changes in the geometry parameters), a training dataset for training this algorithm 21 may be provided using a slight modification of the procedure described with reference to FIG. 4. The reconstructed image data may be provided in the same way. However, instead of the desired value for the measure 58, the respective training dataset may include a plurality of values which describe the modification predefinition 47. For example, the modification predefinition 47 may predefine changes in the geometry parameters 4 which may then be directly incorporated in the training dataset as desired values. Alternatively, it would also be possible to use a common algorithm to predefine the measure 18 for the image quality and the result data 22. In this case, the procedure shown in FIG. 4 for providing training datasets would only have to be modified by additionally incorporating the desired values relating to the modification predefinition 47 in each training dataset.

Although the disclosure has been illustrated and described in detail using the exemplary embodiments, the disclosure is not limited by the disclosed examples, and a person skilled in the art may derive other variations therefrom without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for determining corrected acquisition geometries of projection images of a projection image dataset, the method comprising:
   providing a projection image dataset having a plurality of projection images of an object under examination, wherein the plurality of projection images have been acquired by an acquisition device in different acquisition geometries;
   determining, by a first optimization method, a provisional acquisition geometry for each projection image of the plurality of projection images by minimizing a first cost function by varying the provisional acquisition geometry, wherein the first cost function is contingent on a plurality of consistency measures determined based on the provisional acquisition geometry for a respective pair of projection images; and
   determining, by a second optimization method, a respective corrected acquisition geometry for each projection image of the plurality of projection images by minimizing a second cost function by varying the corrected acquisition geometries, wherein the second cost function is contingent on a measure for an image quality of image data reconstructed based on the plurality of projection images and the corrected acquisition geometries for the plurality of projection images, wherein, in a first iteration act of the second optimization method, the provisional acquisition geometries determined by the first optimization method are used as corrected acquisition geometries.

2. The method of claim 1, wherein the projection image dataset is determined by predefining for each projection image of the plurality of projection images a desired position and/or a desired orientation for the acquisition device and by using at least one actuator to place the acquisition device in the desired position and/or the desired orientation, after which the acquisition device is used to acquire the respective projection image, and wherein, in a first iteration act of the first optimization method, acquisition geometries predefined based on the respective desired position and/or the desired orientation are used as the provisional acquisition geometries.

3. The method of claim 2, wherein the desired positions and/or the desired orientations are predefined depending on one or more of the object under examination, a user input, or that the desired positions do not lie on a circular path.

4. The method of claim 1, wherein the acquisition device is a C-arm having an X-ray detector that is disposed together with an X-ray source on a support.

5. The method of claim 1, wherein the projection image dataset is determined by predefining for each projection image of the plurality of projection images a desired position and/or a desired orientation for the acquisition device with respect to a positioning device on which the object under examination is supported, wherein at least one actuator is used to place the acquisition device in the desired position and/or the desired orientation, after which the acquisition device is used to acquire the respective projection image, and wherein, in a first iteration act of the first optimization method, the provisional acquisition geometries are predefined on an assumption that the object under examination does not move with respect to the positioning device between the acquisitions of the projection images or moves according to a predefined pattern of motion.

6. The method of claim 1, wherein the second optimization method is carried out subject to a constraint that a value of the first cost function for the corrected acquisition geometries is less than or equal to a value of the first cost function for the provisional acquisition geometries determined by the first optimization method.

7. The method of claim 1, wherein an algorithm trained by machine learning is used to determine the measure for the image quality.

8. The method of claim 7, wherein the algorithm has been or is trained by training datasets comprising, for each training dataset, the reconstructed image data and a desired value for the image quality measure to be determined for the reconstructed image data, wherein the reconstructed image data is or has been reconstructed from predefined projection images such that an acquisition geometry for at least one projection image of the plurality of projection images that has been modified according to a modification predefinition is taken into account for the reconstruction, and wherein the desired value is or has been determined as a function of the modification predefinition.

9. The method of claim 1, wherein the second cost function is additionally contingent on a plurality of consistency measures determined as a function of the corrected acquisition geometry for a respective pair of projection images.

10. The method of claim 1, wherein the provisional acquisition geometry and the corrected acquisition geometry of each projection image of the plurality of projection images is described by a plurality of geometry parameters, wherein each geometry parameter of the plurality of geometry parameters describes a translation or a rotation of the acquisition device or of a component the acquisition device with respect to the object under examination, and wherein, as part of the first optimization method, only a subgroup of geometry parameters less than all of the plurality of geometry parameters is varied in order to determine the provisional acquisition geometries.

11. The method of claim 1, further comprising:

determining, by a third optimization method, a final acquisition geometry for at least one projection image of the plurality of projection images by minimizing a third cost function by varying the final acquisition geometry, wherein the third cost function is contingent on a measure for a deviation between a forward projection of a three-dimensional image data according to a final imaging geometry from the projection image, and wherein, in a first iteration act of the third optimization method, the corrected acquisition geometry for the projection image determined by the second optimization method is used as the final acquisition geometry.

12. The method of claim 11, wherein one or more of the provisional acquisition geometry, corrected acquisition geometry, or final acquisition geometry for at least one respective projection image of the plurality of projection images is varied in each case based on result data of an algorithm trained by machine learning, and wherein, as input data, the algorithm processes at least one image slice reconstructed based on the plurality of projection images.

13. A device comprising:

a processor for determining corrected acquisition geometries of projection images, wherein the processor is configured to:

provide a projection image dataset having a plurality of projection images of an object under examination, wherein the plurality of projection images have been acquired by an acquisition device in different acquisition geometries;

determine, by a first optimization method, a provisional acquisition geometry for each projection image of the plurality of projection images by minimizing a first cost function by varying the provisional acquisition geometry, wherein the first cost function is contingent on a plurality of consistency measures determined based on the provisional acquisition geometry for a respective pair of projection images; and determine, by a second optimization method, a respective corrected acquisition geometry for each projection image of the plurality of projection images by minimizing a second cost function by varying the corrected acquisition geometries, wherein the second cost function is contingent on a measure for an image quality of image data reconstructed based on the plurality of projection images and the corrected acquisition geometries for the plurality of projection images, wherein, in a first iteration act of the second optimization method, the provisional acquisition geometries determined by the first optimization method are used as corrected acquisition geometries.

14. A non-transitory computer-readable medium on which a computer program is stored, wherein the computer program, when executed by a processing device, is configured to:
provide a projection image dataset having a plurality of projection images of an object under examination, wherein the plurality of projection images have been acquired by an acquisition device in different acquisition geometries;
determine, by a first optimization method, a provisional acquisition geometry for each projection image of the plurality of projection images by minimizing a first cost function by varying the provisional acquisition geometry, wherein the first cost function is contingent on a plurality of consistency measures determined based on the provisional acquisition geometry for a respective pair of projection images; and
determine, by a second optimization method, a respective corrected acquisition geometry for each projection image of the plurality of projection images by minimizing a second cost function by varying the corrected acquisition geometries, wherein the second cost function is contingent on a measure for an image quality of image data reconstructed based on the plurality of projection images and the corrected acquisition geometries for the plurality of projection images, wherein, in a first iteration act of the second optimization method, the provisional acquisition geometries determined by the first optimization method are used as corrected acquisition geometries.

* * * * *